United States Patent

Gupta et al.

(10) Patent No.: US 9,659,121 B1
(45) Date of Patent: May 23, 2017

(54) DETERMINISTIC AND STATISTICAL TIMING MODELING FOR DIFFERENTIAL CIRCUITS

(71) Applicant: International Business Machines Corporation, Armonk, NY (US)

(72) Inventors: Hemlata Gupta, Poughkeepsie, NY (US); Jin Hu, Poughkeepsie, NY (US); Chad A. Marquart, Austin, TX (US); Vasant Rao, Fishkill, NY (US); Debjit Sinha, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/968,205

(22) Filed: Dec. 14, 2015

(51) Int. Cl.
 *G06F 17/50* (2006.01)
 *G06F 17/18* (2006.01)

(52) U.S. Cl.
 CPC ......... *G06F 17/5036* (2013.01); *G06F 17/18* (2013.01)

(58) Field of Classification Search
 USPC ................. 703/2, 14, 19; 330/277
 See application file for complete search history.

(56) References Cited

U.S. PATENT DOCUMENTS

| 5,586,046 | A | 12/1996 | Feldbaumer |
| 5,787,008 | A | 7/1998 | Pullela |
| 8,024,683 | B2 | 9/2011 | Darsow |
| 8,375,343 | B1 | 2/2013 | Tiwary |
| 8,886,511 | B2 | 11/2014 | Hamdan |
| 9,110,596 | B2* | 8/2015 | Ware .............. G06F 1/3275 |
| 9,312,860 | B1* | 4/2016 | Paschal .......... G06F 17/5045 |
| 2003/0009318 | A1 | 1/2003 | Amatangelo |
| 2013/0083611 | A1* | 4/2013 | Ware .............. G06F 1/3275 365/191 |

* cited by examiner

*Primary Examiner* — Thai Phan
(74) *Attorney, Agent, or Firm* — Cantor Colburn LLP; Steven Meyers (57) ABSTRACT

A computer program product for improved modeling of differential circuits is provided. The computer program product includes a computer readable storage medium having program instructions embodied therewith. The program instructions are readable and executable by a processing circuit to cause the processing circuit to represent a configuration of a differential circuit on a defined space with representations of single-ended inputs and outputs disposed as differential input and output pairs along borders of the defined space, respectively, for each differential input and output pair, introduce an internal input or output differential node to feed from or to feed a corresponding differential input or output pair within the borders, respectively, with the internal input and output differential nodes being connectable and perform timing calculations with respect to input and output differential nodes.

20 Claims, 6 Drawing Sheets

DETERMINISTIC AND STATISTICAL TIMING MODELING FOR DIFFERENTIAL CIRCUITS

BACKGROUND

The present invention relates to differential circuit timing modeling and, more specifically, to deterministic and statistical timing modeling for differential circuits and to the generation of deterministic and statistical timing macro-models for differential circuits.

Static timing analysis (STA) relates to the computation and propagation of expected timing values of an integrated circuit (IC) before the physical fabrication process of a chip. The results of STA are used to predict whether or not the design will meet all the timing requirements or constraints for proper functionality.

Synchronous high-performance ICs have traditionally been characterized by a clock frequency at which they operate. Gauging the ability of a circuit to operate at the specified speed requires measurement, during the design process, of its delay at numerous steps. Moreover, delay calculations must be incorporated into the inner loop of timing optimizers at various phases of design, such as logic synthesis, layout (placement and routing) and in in-place optimizations performed late in the design cycle. While such timing measurements can theoretically be performed using a rigorous circuit simulation, such an approach is liable to be too slow to be practical. Instead, timing modeling plays a vital role in facilitating fast and reasonably accurate measurements of circuit timing where a timing macro-model encapsulates the relevant timing information in a compact form that was generated from the STA of the original design. The speedup comes from the simple but accurate timing models.

In a synchronous digital system, data is supposed to move in lockstep, advancing one stage on each tick of the clock signal. This is enforced by synchronizing elements such as flip-flops or latches, which copy their input to their output when instructed to do so by the clock. Only two kinds of timing errors are possible in such a system. These include a setup time violation, when a signal arrives too late, and misses the time when it should advance, and a hold time violation, when an input signal changes too soon after the clock's active transition. The time when a signal arrives can vary due to many reasons such as the input data varying, the circuit performing different operations, temperature and voltage changes and manufacturing differences in exact constructions of each circuit part. The main goal of timing analysis is to verify that despite these possible variations, all signals will arrive neither too early nor too late and hence proper circuit operation can be assured.

SUMMARY

According to an embodiment of the present invention, a computer program product for improved modeling of differential circuits is provided. The computer program product includes a computer readable storage medium having program instructions embodied therewith. The program instructions are readable and executable by a processing circuit to cause the processing circuit to represent a configuration of a differential circuit on a defined space with representations of single-ended inputs and outputs disposed as differential input and output pairs along borders of the defined space, respectively, for each differential input and output pair, introduce an internal input or output differential node to feed from or to feed a corresponding differential input or output pair within the borders, respectively, with the internal input and output differential nodes being connectable and perform timing calculations with respect to input and output differential nodes.

According to another embodiment of the present invention, a computing system for improved modeling of differential circuits is provided. The computing system includes a computer readable storage medium having instructions stored thereon that are executable by a processing circuit to cause the processing circuit to represent a configuration of a differential circuit on a defined space with representations of single-ended inputs and outputs disposed as differential input and output pairs along borders of the defined space, respectively, for each differential input and output pair, introduce an internal input or output differential node to feed from or to feed a corresponding differential input or output pair within the borders, respectively, with the internal input and output differential nodes being connectable and perform timing calculations with respect to input and output differential nodes.

According to yet another embodiment of the present invention, a computer-implemented method for improved modeling of differential circuits is provided. The computer-implemented method includes representing a configuration of a differential circuit on a defined space with representations of single-ended inputs and outputs disposed as differential input and output pairs along borders of the defined space, respectively, for each differential input and output pair, introducing an internal input or output differential node to feed from or to feed a corresponding differential input or output pair within the borders, respectively, with the internal input and output differential nodes being connectable and performing timing calculations with respect to input and output differential nodes.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, a method of improved deterministic and statistical timing modeling for differential circuits is provided and includes sensitivity applications and calculations.

For the purposes of the following description, the following assumptions and definitions will be used.

The critical path of a circuit is defined as the path between an input and an output with the worst slack, which is a function of component delay. Once circuit timing has been computed, the critical path can easily be found by using a trace-back method.

The arrival time of a signal is the time elapsed for a signal to arrive at a certain point. The reference, or time 0.0, is often taken as the arrival time of an input clock signal. To calculate the arrival time, delay calculation of all the components in the path will be required. Arrival times, and indeed almost all times in timing analysis, are normally kept as a pair of values including the earliest possible time at which a signal can change and the latest.

Required time is the latest time at which a signal can arrive at an output location of a circuit without making the clock cycle longer than desired. The computation of the required time proceeds as follows: at each primary output, the required times for rise/fall are set according to the specifications provided to the circuit. Next, a backward topological traversal is carried out, processing each gate when the required times at all of its fan-outs are known.

The slack associated with each connection is the difference between the required time and the arrival time. A positive slack at a node implies that the arrival time at that node may be increased without affecting the overall delay of the circuit. Conversely, negative slack implies that a path is too slow, and the path must be sped up (or the reference signal delayed) if the whole circuit is to work at the desired speed.

Figure 1:
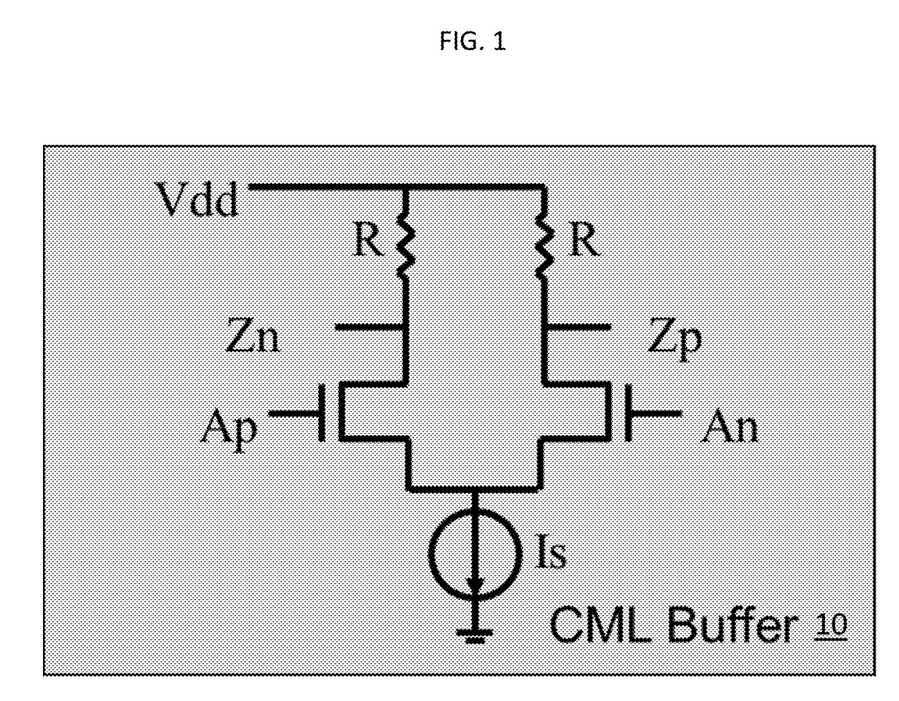
FIG. 1 is a schematic illustration of an example differential circuit that encodes a differential buffer.

Differential signaling is a method for electrically transmitting information using two complementary signals and is found in differential circuits. The technique sends a same electrical signal as a differential input pair of signals to a differential output pair of signals.

Where source and receiver impedances in a given differential circuit are equal, external electromagnetic interference tends to affect both conductors identically. Since the receiving circuit only detects the difference between the wires, the technique resists electromagnetic noise compared to one conductor with an un-paired reference (ground). The technique works for both analog signaling and digital signaling With reference to FIGS. 1-3, a conventional modeling scheme may be applied to a differential circuit arranged as a current-mode logic (CIVIL) buffer 10. As shown in FIG. 1, the CIVIL buffer 10 includes a first input signal Ap, a first output signal Zp, a second input signal An and a second output signal Zn. The first and second input signals Ap and An define a first differential pair and the first and second output signals Zn and Zp define a second differential pair. The CIVIL buffer 10 further includes a current source Is, a supply voltage Vdd and resistors R.

Figure 2:
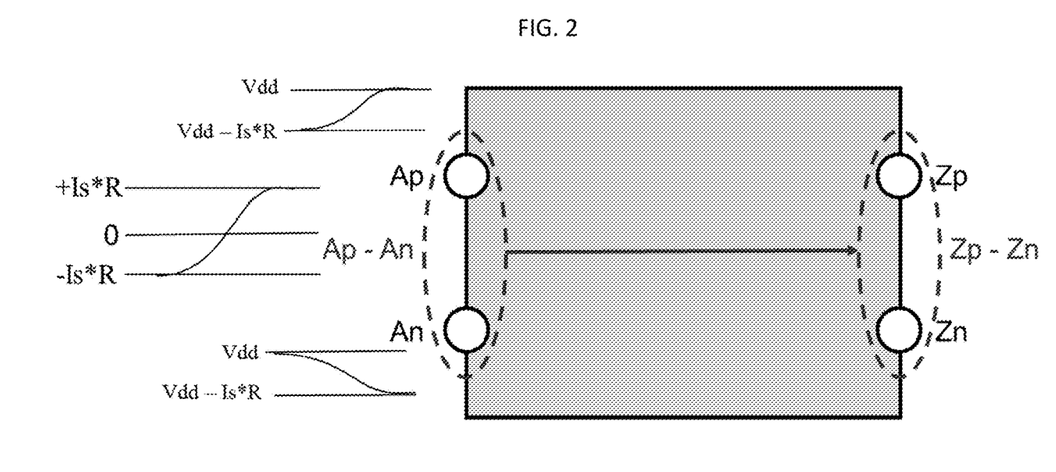
FIG. 2 is a graphical representation of the differential circuit of FIG. 1.
Figure 3:
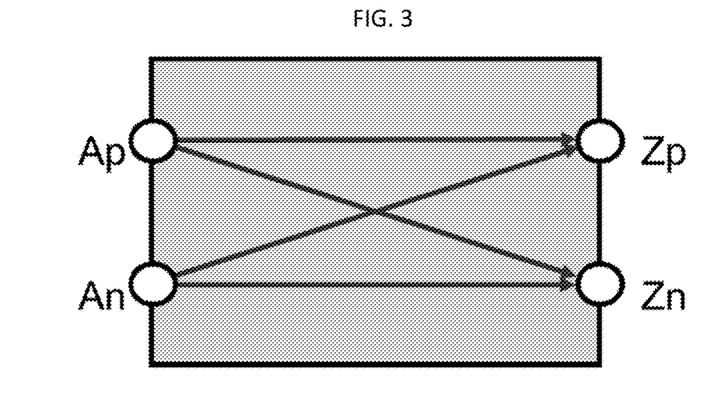
FIG. 3 is a graphical representation of the differential circuit of FIG. 1.

A timing relationship between the two differential pairs is illustrated in FIG. 2 and is based on the conventional modeling approaching illustrated in FIG. 3. As shown in FIG. 3, the first and second input and output signals Ap, An, Zn and Zp of the CML buffer 10 are all modeled as timing nodes. Propagate segments or pegs between the timing nodes are built to describe timing relationships between single-ended signals such, Ap→Zp, Ap→Zn, An→Zp and An→Zn. Problems with such approaches are that they may lead to erroneous results (due to timing based on single inputs without consideration being given to a relationship between Ap and An to compute Zp and Zn) and they may not provide designer feedback between Zp and Zn (because Ap and An are treated independently).

Figure 4:
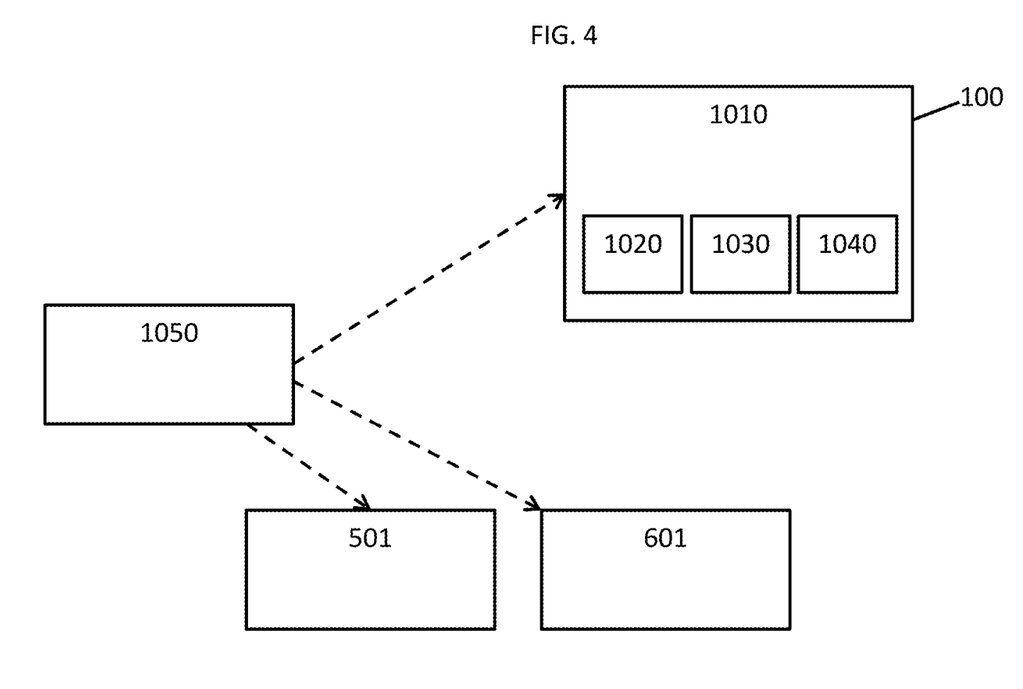
FIG. 4 is a graphical representation of a computer program product in accordance with embodiments.
Figure 5:
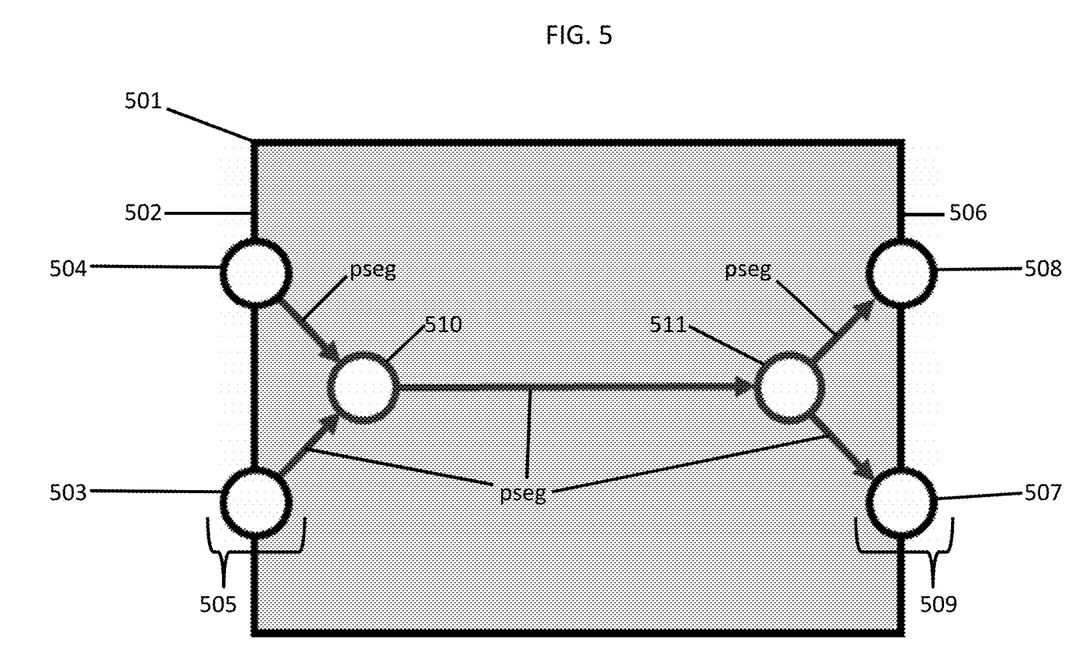
FIG. 5 is a graphical representation of the differential circuit in FIG. 1.
Figure 6:
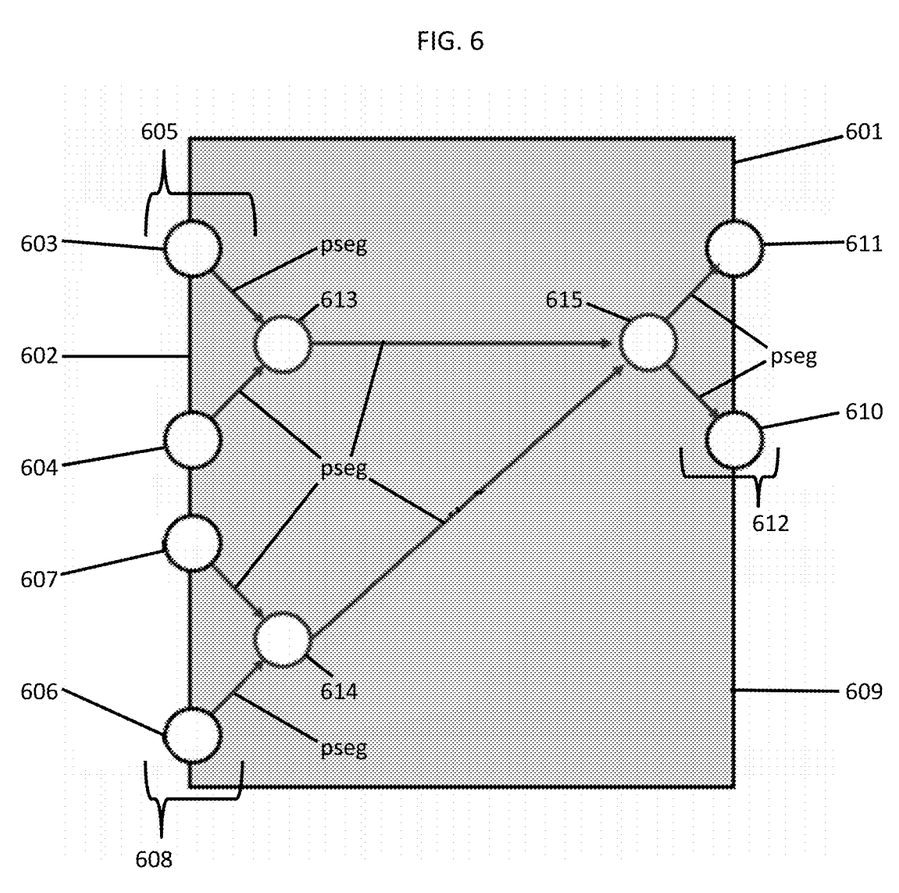
FIG. 6 is a graphical representation of a differential circuit in accordance with embodiments.

With reference to FIGS. 4-6, a computer program product 100 is provided for improved modeling of differential circuits. The computer program product 100 includes a computer readable storage medium 1010 having first-third program instructions 1020, 1030 and 1040 embodied therewith. The first-third program instructions 1020, 1030 and 1040 are readable and executable by a processing circuit 1050 to cause the processing circuit 1050 to execute a computer-implemented method as described herein. Such computer-implemented method generally includes representing a configuration of a differential circuit on a defined space with representations of single-ended inputs and outputs disposed as differential input and output pairs along borders of the defined space, respectively, for each differential input and output pair, introducing an internal input or output differential node to feed from or to feed a corresponding differential input or output pair within the borders, respectively, with the internal input and output differential nodes being connectable and performing timing calculations with respect to input and output differential nodes.

In representing a configuration of a differential circuit on a defined space, it is to be understood that a number of the differential input pairs for the configuration may be a same as or different from a number of the differential output pairs. For example, as shown in FIG. 5, the configuration 501 is provided for the differential CIVIL buffer 10 of FIGS. 1-3 and includes first and second input signals represented along lateral border 502 by first and second single-ended input nodes 503 and 504, which are grouped into a differential input pair 505. An internal input differential node 510 (to be described below) is introduced and represents a difference between the first and second single-ended input nodes 503 and 504. The configuration 501 further includes first and second single-ended output signals represented along lateral border 506 by first and second single-ended output nodes 507 and 508, which are grouped into differential output pair 509. An internal output differential node 511 (to be described below) is introduced and represents a difference between the first and second single-ended output nodes 507 and 508. A propagation segment (pseg) connecting the internal input differential node 510 and the internal output differential node 511 encapsulates a delay between the internal input differential node 510 and the internal output differential node 511.

As a contrasting example, as shown in FIG. 6, the configuration 601 is provided for a clocked differential circuit and includes first and second input signals represented along lateral border 602 by first and second single-ended input nodes 603 and 604, which are grouped into a first differential input pair 605. A first internal differential input node 613 (to be described below) is introduced and represents a difference between the first and second single-ended input nodes 602 and 603. The configuration 601 further includes third and fourth input signals that are represented along the lateral border 602 by third and fourth single-ended input nodes 606 and 607, which are grouped into a second differential input pair 608. A second internal differential input node 614 (to be described below) is introduced and represents a difference between the third and fourth single-ended input nodes 607 and 608. The configuration 601 also includes first and second output signals represented along lateral border 609 by the first and second single-ended output nodes 610 and 611, which are grouped into differential output pair 612. An internal differential output node 615 (to be described below) is introduced and represents a difference between the first and second single-ended output nodes 610 and 611. The pseg connecting the first internal differential input node 613 and the internal differential output node 615 encapsulates a delay between the first internal differential input node 613 and the internal differential output node 615. The pseg connecting the second internal differential input node 614 and the internal differential output node 615 encapsulates a delay between the second internal differential input node 614 and the internal differential output node 615. Any timing test or check is performed between the first and second internal differential input nodes 613 and 614.

Of course, it is to be understood that many other configurations are available besides those illustrated in FIGS. 5 and 6. These include configurations with two differential input pairs and two differential output pairs as well as configurations with one differential input pair and two differential output pairs.

In any case, for the embodiments of FIG. 5, the configuration 501 will further include the introduced representations of the internal input differential node 510 and the internal output differential node 511 within the lateral borders 502 and 506. The internal input differential node 510 is fed from corresponding differential input pair 505 and the internal output differential node 511 feeds corresponding differential output pair 509 (see, e.g., the corresponding psegs illustrated in FIG. 5). As noted above, the internal input differential node 510 and the internal output differential node 511 are connectable with each other such that timing calculations with respect to the input and output differential nodes 510 and 511 can be performed.

Similarly, for the embodiments of FIG. 6, the configuration 601 will further include the introduced representations of the first internal input differential node 613, the second internal input differential node 614 and the internal output differential node 615 within the lateral borders 602 and 609. The first and second internal input differential nodes 613 and 614 are respectively fed from corresponding first and second differential input pairs 605 and 608 and the internal output differential node 615 feeds corresponding differential output pair 612 (see, e.g., the corresponding psegs illustrated in FIG. 6). As noted above, the first and second internal input differential nodes 613 and 614 are respectively connectable with the internal output differential node 615 such that timing calculations with respect to the first and second input differential nodes 613 and 614 and the output differential node 615 can be performed.

Figure 7:
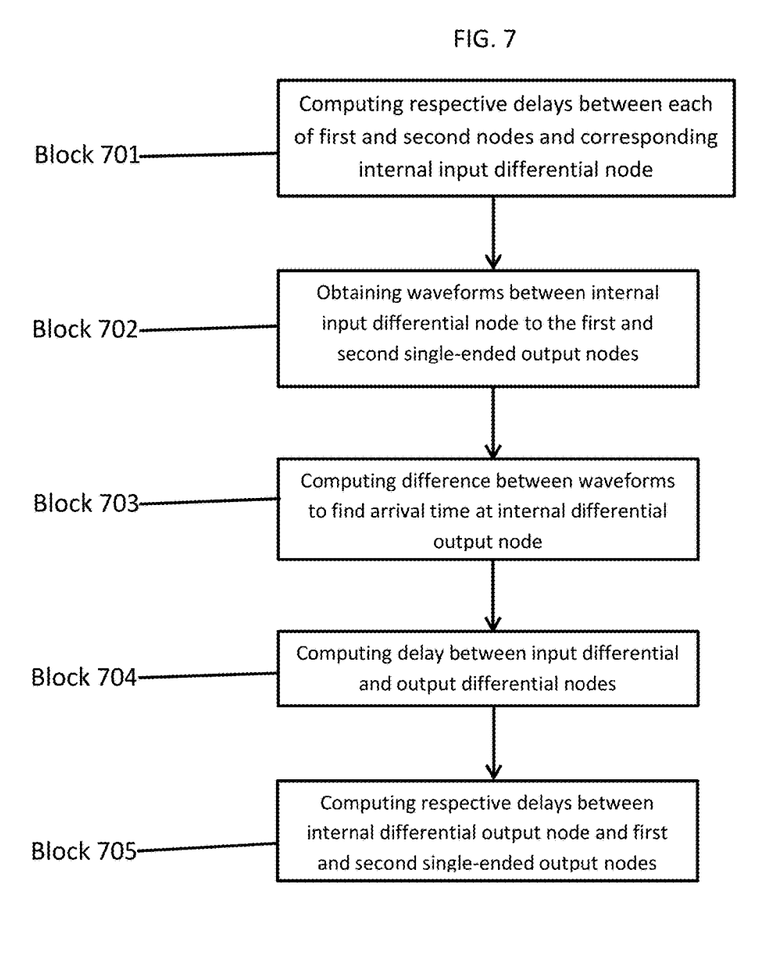
FIG. 7 is a schematic flow diagram illustrating a computer-implemented method of performing timing calculations.

In accordance with embodiments and, with reference to FIG. 5 and with additional reference to FIG. 7, a performance of the timing calculations for the embodiments of FIG. 5 may include computing respective delays between each of the first and second nodes 503 and 504 and the corresponding internal input differential node 510 at block 701 (i.e., computing delay d1), obtaining waveforms (e.g., through simulation) between the internal input differential node 510 to the first and second single-ended output nodes 507 and 508 at block 702 and computing a difference between the waveforms to find an arrival time at the internal differential output node 511 at block 703. The performance of the timing calculations further includes computing a delay between the internal input differential and output differential nodes 510 and 511 at block 704 (i.e., computing delay d2) and computing respective delays between the internal differential output node 511 and the first and second single-ended output nodes 507 and 508 at block 705 (i.e., computing delay d3).

In accordance with embodiments, a goal of the performance of the timing calculations is to provide for deterministic or statistical timing modeling for CIVIL buffer 10 of FIGS. 1-3 (or for the clocked differential circuit of FIG. 6 or for any other differential circuit), as (503, 504)→507 and (503, 504)→508. Here, as definitions, it will be understood that arrival time at nodes 504/508: AT(504/508) [statistical arrival time at 504/508: statAT(504/508)], slew at 504/508: slewAT(504/508) [statistical slew at 504/508: statSlew(504/508)] waveform at 504/508: WF(504/508) [statistical waveform at 504/508: statWF(504/508)] and delay (504, 508): D(504, 508) [statistical delay (504, 508): statD(504, 508)].

More particularly, in order to compute statistical delay at 504, a statistical waveform at internal input differential node 510 is initially obtained as statistical waveform at 504-503. Then, statAT(510) is calculated as a 50% crossing at statWF(510) and statSlew(510)=statWF(510) after normalization (−0.8 to +0.8) where an original slew threshold was 0.8 with 20% maximum/minimum crossings. Thus, characteristics of internal input differential node 510 should not depend on a type of a differential circuit from which it was derived but rather should only be affected by input signals represented by first and second pegs 503 and 504.

The performance of the timing calculations further include taking a difference of input waveforms at the first and second nodes 503 and 504 where:

$$WF(510)=WF(504)-WF(503) \text{ if } AT(504)<AT(503),$$

$$WF(510)=WF(503)-WF(504) \text{ if } AT(503)<AT(504),$$

$$AT(510)=\text{average value crossing of } WF(510), \text{ and}$$

$$\text{delay } d1(504)=AT(510)-AT(504) \text{ and } d1(503)=AT(510)-AT(503).$$

For a statistical extension embodiment, the performance of the timing calculations may use a same process to compute d1(504) and d1(503) with full statistical canonical waveforms instead of deterministic waveforms. While asserted sensitivities are not applied to the canonical waveforms themselves, the difference of full canonical waveforms are taken and applied. Normally, when doing statistical timing, a difference between deterministic waveforms is taken and then applied as asserted sensitivities. However, this leads to an incorrect result because the sensitivities should only be based on the input waveform sensitivities and not the inherent gate-characteristic (asserted) sensitivities.

The performance of the timing calculations may further include obtaining deterministic waveforms WF(508) and WF(507) at fourth node 508 and third node 507, respectively. Here, sensitivities are applied to WF(508) and WF(507) and $$WF(511)=WF(508)-WF(507) \text{ if } AT(508)<AT(507),$$

$$WF(511)=WF(507)-WF(508) \text{ if } AT(507)<AT(508),$$

$$AT(511)=\text{average value crossing of } WF(511), \text{ and}$$

$$\text{delay } d2=AT(511)-AT(510)[AT(510) \text{ previously found}],$$

$$\text{delay } d3(508)=AT(508)-AT(511)[AT(508) \text{ and } AT(511) \text{ known}] \text{ and}$$

$$\text{delay } d3(507)=AT(511)-AT(507)[AT(507) \text{ and } AT(511) \text{ known}].$$

The delays d3(508) and d3(507) can be cached to avoid having to re-compute in future timing models. For a statistical embodiment, once the deterministic waveforms are obtained at WF(508) and WF(507) from internal input differential node 510, apply asserted sensitivities to make deterministic waveforms statistical canonicals, and then compute the delays and arrival times as in the deterministic case.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to the flowchart or block diagram in FIG. 7 of methods, apparatus (systems) and computer program products according to embodiments of the invention. It will be understood that each block and combinations of blocks can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for improved modeling of differential circuits, the computer program product comprising a computer readable storage medium having program instructions embodied therewith, the program instructions being readable and executable by a processing circuit to cause the processing circuit to:
    represent a configuration of a differential circuit on a defined space with representations of single-ended inputs and outputs disposed as differential input and output pairs along opposite lateral borders of the defined space, respectively;
    for each differential input and output pair, introduce an internal input or output differential node to feed from or to feed a corresponding differential input or output pair within the opposite lateral borders, respectively, with the internal input and output differential nodes being connectable;
    represent respective connections between each of the differential input pair and the internal input node as first and second single, unidirectional, entirely straight and inwardly tapering connection arrows, represent respective connections between the internal output node and each of the differential output pair as third and fourth single, unidirectional, entirely straight and outwardly tapering connection arrows and represent a connection between the internal input and output nodes as a fifth single unidirectional and entirely straight connection arrow; and
    perform timing calculations with respect to input and output differential nodes.

2. The computer program product according to claim 1, wherein a number of the differential input pairs is a same as a number of the differential output pairs.

3. The computer program product according to claim 1, wherein a number of the differential input pairs differs from a number of the differential output pairs.

4. The computer program product according to claim 1, wherein a performance of timing calculations comprises:
    computing respective delays between each of the single-ended inputs and the internal input differential node;
    obtaining respective waveforms between each of the single-ended outputs to the internal input differential node;
    computing a difference between each of the single-ended outputs to obtain an arrival time at the internal differential output node;
    computing delays between the internal input and output differential nodes; and
    computing respective delays between each of the single-ended outputs and the internal output differential node.

5. The computer program product according to claim 4, wherein the computing of the respective delays comprises referring to one of deterministic waveforms and statistical waveforms.

6. The computer program product according to claim 4, wherein the computing of the respective delays comprises applying sensitivities to deterministic waveforms in a form of statistical canonicals.

7. The computer program product according to claim 4, wherein the program instructions are readable and executable by the processing circuit to cause the processing circuit to cache computed respective delays.

8. A computing system for improved modeling of differential circuits, the computing system comprising a computer readable storage medium having instructions stored thereon that are executable by a processing circuit to cause the processing circuit to:
    represent a configuration of a differential circuit on a defined space with representations of single-ended inputs and outputs disposed as differential input and output pairs along opposite lateral borders of the defined space, respectively;
    for each differential input and output pair, introduce an internal input or output differential node to feed from or to feed a corresponding differential input or output pair within the opposite lateral borders, respectively, with the internal input and output differential nodes being connectable;
    represent respective connections between each of the differential input pair and the internal input node as first and second single, unidirectional, entirely straight and inwardly tapering connection arrows, represent respective connections between the internal output node and each of the differential output pair as third and fourth single, unidirectional, entirely straight and outwardly tapering connection arrows and represent a connection between the internal input and output nodes as a fifth single unidirectional and entirely straight connection arrow; and
    perform timing calculations with respect to input and output differential nodes.

9. The computing system according to claim 8, wherein a number of the differential input pairs is a same as a number of the differential output pairs.

10. The computing system according to claim 8, wherein a number of the differential input pairs differs from a number of the differential output pairs.

11. The computing system according to claim 8, wherein a performance of timing calculations comprises:

computing respective delays between each of the single-ended inputs and the internal input differential node;

obtaining respective waveforms between each of the single-ended outputs to the internal input differential node;

computing a difference between each of the single-ended outputs to obtain an arrival time at the internal differential output node;

computing delays between the internal input and output differential nodes; and computing respective delays between each of the single-ended outputs and the internal output differential node.

12. The computing system according to claim 11, wherein the computing of the respective delays comprises referring to one of deterministic waveforms and statistical waveforms.

13. The computing system according to claim 11, wherein the computing of the respective delays comprises applying sensitivities to deterministic waveforms in a form of statistical canonicals.

14. The computing system according to claim 11, wherein the program instructions are readable and executable by the processing circuit to cause the processing circuit to cache computed respective delays.

15. A computer-implemented method for improved modeling of differential circuits, comprising:

representing a configuration of a differential circuit on a defined space with representations of single-ended inputs and outputs disposed as differential input and output pairs along opposite lateral borders of the defined space, respectively;

for each differential input and output pair, introducing an internal input or output differential node to feed from or to feed a corresponding differential input or output pair within the opposite lateral borders, respectively, with the internal input and output differential nodes being connectable;

represent respective connections between each of the differential input pair and the internal input node as first and second single, unidirectional, entirely straight and inwardly tapering connection arrows, represent respective connections between the internal output node and each of the differential output pair as third and fourth single, unidirectional, entirely straight and outwardly tapering connection arrows and represent a connection between the internal input and output nodes as a fifth single unidirectional and entirely straight connection arrow; and performing timing calculations with respect to input and output differential nodes.

16. The computer-implemented method according to claim 15, wherein a number of the differential input pairs is a same as or different from a number of the differential output pairs.

17. The computer-implemented method according to claim 15, wherein the performing of timing calculations comprises:

computing respective delays between each of the single-ended inputs and the internal input differential node;

obtaining respective waveforms between each of the single-ended outputs to the internal input differential node;

computing a difference between each of the single-ended outputs to obtain an arrival time at the internal differential output node;

computing delays between the internal input and output differential nodes; and computing respective delays between each of the single-ended outputs and the internal output differential node.

18. The computer-implemented method according to claim 17, wherein the computing of the respective delays comprises referring to one of deterministic waveforms and statistical waveforms.

19. The computer-implemented method according to claim 17, wherein the computing of the respective delays comprises applying sensitivities to deterministic waveforms in a form of statistical canonicals.

20. The computer-implemented method according to claim 17, further comprising caching computed respective delays.

* * * * *